March 27, 1962 S. A. ZYSK ET AL 3,026,603
METHOD OF MAKING ELECTRICAL CONTACTS AND THE LIKE
Filed Oct. 13, 1958
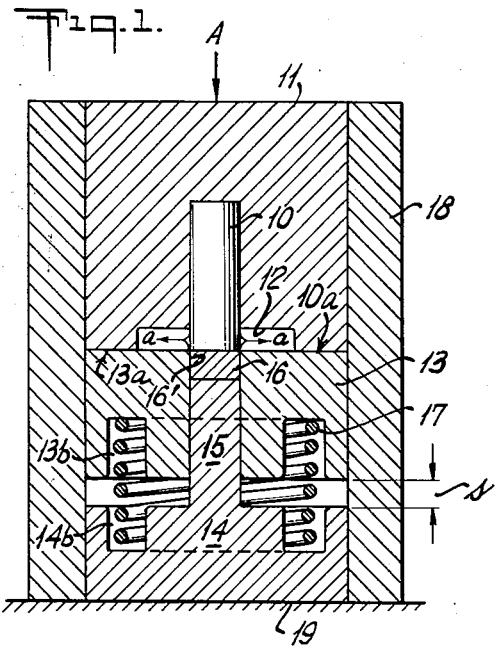
Fig. 1.
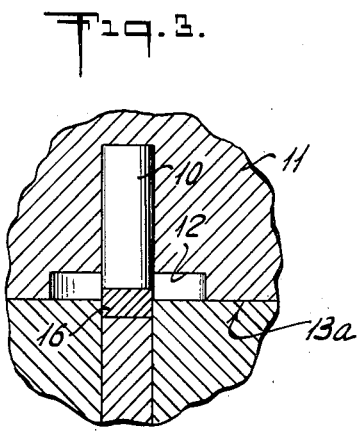
Fig. 3.
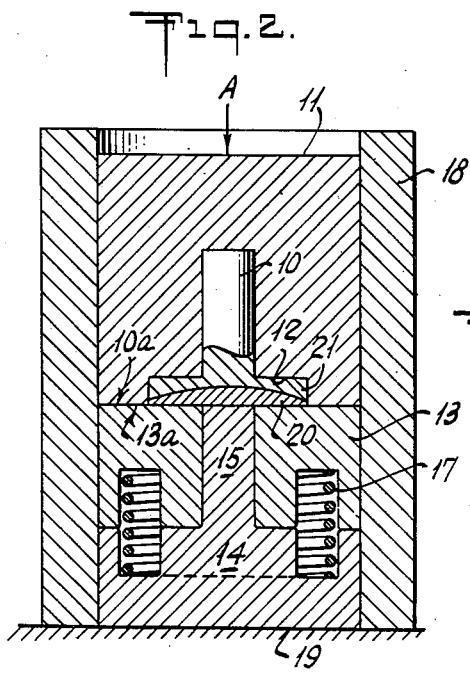
Fig. 2.
Fig. 4.
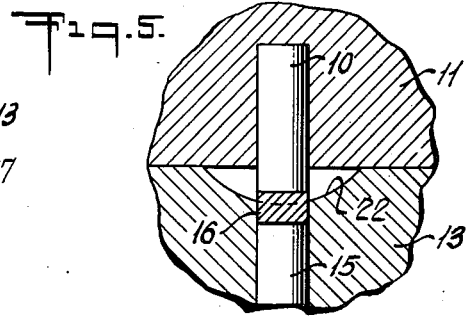
Fig. 5.
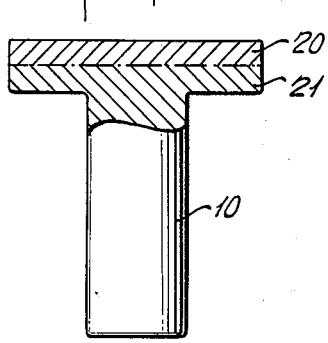
INVENTORS
STANLEY A. ZYSK
WALTER J. ROZMUS
BY
ATTORNEY

United States Patent Office 3,026,603
Patented Mar. 27, 1962

3,026,603
METHOD OF MAKING ELECTRICAL CONTACTS AND THE LIKE
Stanley A. Zysk, Little Falls, and Walter J. Rozmus, Whitesboro, N.Y., assignors to Kelsey-Hayes Company, Detroit, Mich., a corporation of Delaware
Filed Oct. 13, 1958, Ser. No. 766,837
11 Claims. (Cl. 29—155.55)

The present invention relates to a method of and means for making electrical contacts, more particularly to the making of cold pressure welded rivet-like or headed contacts of the type comprising a cylindrical or shank portion of cold pressure weldable contact base metal, such as copper, aluminum etc., terminating in a contact head coated or clad with a layer of precious non-welding contact metal, such as silver, platinum, gold etc.

Among the objects of the invention is the provision of a method of or means for producing headed or rivet-type electrical contacts of this type by a single operation or pressure application, to both upset the end of a contact wire section or base against a slug or pellet of precious contact material, such as silver, and to simultaneously flow and spread the slug metal over and to firmly connect it by cold pressure welding unto the surface of the head formed upon said wire by the upsetting operation. As a result, the invention eliminates heating of the contact metal, as previously used in welding, brazing, soldering or the like operations in the fabrication of coated electrical contacts of this type. Weakening of the contact metal with resultant impairment of the mechanical strength of the contacts is thus basically avoided, while the cold pressure welded bond between the base metal and the precious contact metal insures a minimum of electrical transition resistance and, in turn, increased current carrying capacity of the contacts.

Another object of the invention is the provision of a novel method of and means for producing cold pressure welded headed electrical contacts of the above type, wherein the layer of precious contact metal will have a uniform and minimum thickness compatible with practical contact applications and specifications, to reduce the amount and cost of the silver or other precious contact metal.

Yet another object of the invention is the provision of a headed electrical contact of the general type mentioned, wherein the bond between the contact base and layer of precious contact metal is strong enough to withstand sparking and arcing during operation, and which can be manufactured efficiently and expeditiously, without requiring any foreign bonding substances, such as binders, fluxes, solder or the like at the interface between the base metal and the precious coating metal or layer.

The invention, as to its ancillary objects and novel aspects, will be better understood from the following detailed description, taken in reference to the accompanying drawing forming part of this specification and in which:

FIG. 1 is a cross-section of a simple tool assembly for carrying into effect the method of the invention, the tool being shown in the position prior to upsetting and welding of a wire or the like for forming a headed electrical contact;

FIG. 2 is similar to FIG. 1, showing the tool in the position after upsetting and welding;

FIG. 3 is a fragmentary view of FIG. 1, showing a modification of the invention, to ensure uniform spreading of the precious contact metal unto the surface of the contact head;

FIG. 4 is an elevation, shown on an enlarged scale, of a finished contact having a flat head, as obtained by means of a tool of the type according to FIGS. 1 and 2; and FIG. 5, being similar to FIG. 3, shows still another modification of an upsetting and welding tool for producing headed electrical contacts in accordance with invention.

Like reference numerals denote like parts in the different views of the drawing.

With the foregoing objects in view, the invention involves generally the upsetting of the end of a contact base member, such as a wire section of basic cold pressure weldable contact metal, such for instance as copper, aluminum, etc., against a slug of precious contact metal, such as of silver, platinum etc., serving as a reacting or expanding surface, to form an upset or head at one end of said wire and to simultaneously flow and spread the slug metal unto the surface of said head, in such a manner as to result in a firm bonding of the spread metal layer to the contact surface of said head by cold flow or pressure welding. In order to enable such a combined upsetting and welding operation to be carried out reliably and efficiently and to prevent crushing of the slug by said wire under the impact of the initial upsetting pressure, the slug is confined in a cavity or recess of a suitable die block or anvil, with only one surface of the slug being exposed and contacting the end of said wire section or equivalent contact base member. Further means are provided to progressively force the slug out of said cavity as the upsetting of the wire proceeds, in such a manner as to cause increasing amounts of the slug metal to be applied to and to be spread over the surface of the upset or head being formed and to be firmly bonded thereto by cold pressure welding upon termination of the upsetting operation. In order to ensure a uniform flow and spreading of the slug metal over the entire contact surface, the slug advantageously initially projects to a predetermined extent from said cavity, as will be described in greater detail thereafter.

A simplified tool assembly for carrying into effect the invention, as exemplified by the drawing, may comprise a first split die block or holding member for gripping or supporting a wire section or the like base member, forming the shank portion of the contact to be formed, and a cooperating die comprising a pair of relatively movable and yieldingly connected tool members designed to provide a recess or cavity of varying depth, to hold said slug placed therein in abutting engagement with the end of said wire section, whereby said slug acts as an expanding anvil or surface for the upsetting of said wire and forming of the contact head. To this end, one of said tool members which may be in engaging contact with said die block, may have a bore designed to receive a plunger or cylindrical extension of the other member snugly but slidably fitting within said bore, in such a manner as to provide a cavity of varying depth for said slug bounded by the wall of said bore, on the one hand, and by the surface of said plunger, on the other hand. As a result, upon application of a suitable pressure between said block and said second tool member, to initiate the upsetting of said wire section, the plunger will be caused to slide within said bore, in such a manner as to progressively force said slug out of said cavity as the upsetting operation proceeds and to flow and spread an ever increasing amount of slug metal unto and to weld it to the surface of the head being formed by cold flow or pressure welding.

As will be understood, the surface of said wire section being in contacting engagement with said slug, should be properly cleaned to remove surface oxide and other contaminating matter liable to impede or prevent cold pressure welding of the layer of precious contact metal unto the head of base metal formed upon said wire section.

Preferred methods of cleaning are scratch brushing or simple cutting or trimming of the wire at right angle to its axis prior to the upsetting operation.

Referring more particularly to FIGS. 1 and 2 of the drawing, the numeral 10 indicates a wire section forming the shank or base portion of a contact to be formed, said wire having a round, square, hexagonal or the like cross-section and consisting of a suitable cold pressure weldable contact base metal, such as copper, aluminum or the like metal or metal alloy. In the example shown, the wire section 10 is inserted in a corresponding bore of a first pressure applying tool member or die block 11 and held therein in any suitable manner (not shown) such as by clamping or constructing the member 11 in the form of split conical dies provided with suitable clamping means, as will be readily understood and is shown for instance by U.S. Patent No. 2,774,262. The lower face 10a of the die block 11 is provided with recess 12 surrounding the projecting wire section 10 and determining the shape of the head to be formed upon the end of the wire, as will become more apparent hereafter.

Cooperating with die block or holding member 11 for the wire 10 are a pair of further relatively movable tool members 13 and 14, the former having a central bore designed to receive a plunger or cylindrical anvil forming an extension 15 of member 14 and snugly but slidably fitting within said bore, whereby to provide a cavity or recess 16' of varying depth for the slug 16 of precious contact metal which may be of like cross-section as the wire section 10. The upper face 13a of the member 13 exterior of the recess 12 engages the lower face 10a of the die block 11, while the members 13 and 14 are yieldingly connected through a compression spring 17 or the like mounted in internal annular recesses 13b and 14b of the members respectively. The entire assembly may be mounted in a cylindrical housing 18 snugly fitting around and serving as a guide for the tool members 11, 13 and 14, the latter being attached to a fixed support or surface 19.

In operation, the slug 16 is placed in the recess 16' formed by the members 13 and 14 with the upper exposed end thereof being flush with the surface 13a of member 13, according to the exemplification shown by FIGS. 1 and 2. Wire section 10 is then inserted or mounted in the die block 11, to be held therein by clamping or otherwise and with the cleaned end surface thereof being flush with the face 10a of the die. The latter is then inserted in the outer tube or guide 18 with both die forces 10a and 13a as well as the wire section 10 and slug 16 in abutting contacting engagement with one another, in the manner shown in FIG. 1.

Upon application of a suitable pressure to the die block 11 in the direction indicated by the arrow A, by aid of a suitable press (hand press, hydraulic press, etc.), the member 13 will be initially depressed or forced towards the member 14 against the action of the spring 17, whereby to cause the slug 16 to protrude beyond the surface 13a of the member 13 and to initiate the lateral upsetting of the projecting portion of the wire section 10, as shown by the arrows $a$ in the drawing indicating the outward metal flow or upsetting of the end of the wire within the recess 12 of the die 11. During this operation, the projecting portion of the slug 16 acts as a cooperating anvil or expanding surface for the wire section 10, to enable the upsetting thereof, in a manner readily understood. As the upsetting proceeds, by continued pressure application to the die block 11, the slug 16 is forced out of its cavity to an ever increasing extent, in such a manner as to continue the upsetting of the wire section 10 and to flow and spread the slug metal unto the surface of the upset head being formed and to finally firmly bond it to said surface by cold flow or pressure welding, after the forming or upsetting of the wire has been completed and the entire slug had been forced out of the cavity in the member 13. This condition is reached upon engagement of the members 13 and 14, FIG. 2, which are initially spaced by predetermined distances corresponding to the thickness of the slug 16, as shown in FIG. 1.

There is thus obtained by means of a tool as shown in FIGS. 1 and 2 and by a single pressure application an electrical contact having a shank portion 10 of copper, aluminum or other base contact metal and a head 21 of a shape corresponding to the recess 12 in the die member 11, said head being coated with a layer 20 of precious contact metal, such as silver, platinum or the like bonded thereto by an intimate solid phase cold pressure welded bond. This invention thus principally eliminates the defects and drawbacks of previous bonding methods used in the fabrication of rivet-type or headed electrical contacts of the type described herein.

The flow of the metal of the slug 16, aside from other considerations, depends upon the relative hardness of the slug metal compared with the base metal of the wire section 10. Thus, if copper is used as base metal and silver as contact metal, the latter having a hardness about one-half that of the former, an uneven distribution of contact metal has been found to occur, that is, with the thickness of the silver layer being greater in the center compared with the periphery of the contact surface, as shown in FIG. 2. If a more uniform spread of the contact metal is desired, the initial metal flow may be increased by a design of the tool to cause the slug to partly project in the initial position beyond the cavity or surface 13a of the member 13 and into the recess 12 of the die block 11, in the manner shown in FIG. 3. Thus where an exactly uniform thickness of the layer 20 of contact metal is not required, the slug 16 may be of a minimum size so as to cover the surface of the contact in an effort to reduce the amount and cost of the precious contact metal. If a contact metal of greater hardness is used, such as platinum, the size of the slug can be further reduced without impairing the uniformity of the layer 20 formed upon the surface of the head 21.

FIG. 4 shows a contact made by a tool according to FIG. 3, having a shank 10 and a head comprising equal amounts of copper 21 and silver 20 of uniform thickness. In place of a plane contact surface, the contact head may be formed with any desired shape by a corresponding design of the recess 12 in the die block 11. The recess may be provided in either of the tool members 11 or 13. Thus, FIG. 5 shows a dome-shaped recess 22 in the member 13 into which project both the wire section 10 and slug 16, whereby to result in a round or dome-shaped contact head. Other modifications and variations will readily suggest themselves to those skilled in the art within the purview of the general concept underlying thought of the invention.

In the foregoing, the invention has been described with reference to a specific illustrative device and method. It will be evident, however, that variations and modifications, as well as the substitution of equivalent parts and elements for those shown and described herein for illustration, may be made in accordance with the broader scope and spirit of the invention as set forth in the appended claims. The specification and drawing are accordingly to be regarded in an illustrative rather than in a restrictive sense.

We claim:

1. A method of fabricating coated rivet-type electrical contacts comprising placing the free end of a wire section or the like of cold pressure weldable contact base metal in abutting contacting engagement with a slug of precious contact metal also of cold pressure weldable material, initially confining said slug to present a free end of predetermined, including zero, projecting length engaging said wire section, and applying upsetting pressure axially of said slug and wire section while simultaneously progressively releasing said slug from its confinement, to increase the projecting length thereof in proportion as the pressure application is continued, whereby to forge a head upon the end of said wire section by upsetting against said slug acting as a cooperating anvil and to flow and spread the slug metal over and to cold pressure weld it unto the surface of the head formed upon termination of the upsetting operation.

2. A method of fabricating coated rivet-type electrical contacts comprising placing the free end of a wire section or the like of cold pressure weldable contact base metal in abutting contacting engagement with the end of a slug of precious contact metal also of cold pressure weldable material and having a lesser hardness than said base metal, initially confining said slug to present a free end of predetermined length engaging said wire section, and applying upsetting pressure axially of said slug and wire section while simultaneously progressively releasing said slug from its confinement to increase the projecting length thereof in proportion as the pressure application is continued, whereby to produce a head upon the end of said wire section by upsetting against said slug acting as a cooperating anvil and to flow and spread the slug metal over and cold pressure weld it unto the surface of the head formed upon termination of the upsetting operation.

3. A method of fabricating rivet-type electrical contacts comprising firmly holding a wire section or the like of cold pressure weldable contact metal in a first tool member with one end of said section projecting by a predetermined distance from a face of said member, placing a slug of different cold pressure weldable contact metal having a diameter equal to the diameter of said section in a cavity of variable depth in the face of a second tool member in close fitting engagement with the walls of said cavity so as to initially project said slug by a predetermined, including zero, distance from the face of said second member, arranging said slug and section in axially aligned abutting relation, and applying pressure to said members in a direction axially of said slug and section while simultaneously reducing the depth of said cavity, to increase the projecting distance of said slug, in proportion as the pressure application is continued, to thereby forge an upset head upon said wire section and to substantially uniformly flow and spread the slug metal over and to cold pressure weld it unto the surface of the head formed upon said section.

4. In a method of fabricating electrical contacts as claimed in claim 3, wherein said slug is flush with the edge of said cavity at the beginning of the upsetting operation.

5. In a method of fabricating electrical contacts as claimed in claim 3, wherein the metal of said slug has a lesser hardness than said base metal and said slug projects from said cavity by a predetermined distance at the beginning of the upsetting operation.

6. In a method of fabricating electrical contacts as claimed in claim 3, wherein said wire consists of copper and said slug consists of silver and projects from said cavity at the beginning of the upsetting operation by a predetermined distance.

7. A method of fabricating coated rivet-type electrical contacts comprising producing a clean butt end surface upon a wire section of cold pressure weldable contact metal, firmly holding said wire section in a first tool member with the cleaned end surface projecting by a predetermined distance from a face of said member, placing a slug of different cold pressure weldable contact metal having a diameter equal to the diameter of said section in a cavity of variable depth in the face of a second tool member in close fitting engagement with the walls of said cavity so as to initially project said slug by a predetermined, including zero, distance from the face of said second member, arranging said slug and section in axially aligned abutting relation, and applying pressure to said members in a direction axially of said slug and section while simultaneously reducing the depth of said cavity, to increase the projecting distance of said slug, in proportion as the pressure application is continued, to thereby forge an upset head upon said wire section and to substantially uniform flow and spread the slug metal over and to cold pressure weld it unto the surface of the head formed upon said section.

8. In a method of fabricating electrical contacts as claimed in claim 7, wherein said wire section consists of copper and said slug consists of silver and projects from said cavity at the beginning of the upsetting operation by a predetermined distance.

9. A method of fabricating coated rivet-type electrical contacts comprising firmly holding a wire section of cold pressure weldable contact metal in a tool member with one end of said section being exposed to project by a predetermined distance from a face of said member, axially aligning said section with a cylindrical anvil and a disc of different contact metal having diameters equal to the diameter of said section with said disc being interposed between and in abutting engagement with the opposing end surfaces of said section and said anvil, laterally confining said disc to provide an initial exposed portion thereof having a predetermined, including zero, projecting height abutting the exposed end surface of said wire section, and applying pressure between said member and anvil in a direction axially of said section and anvil while simultaneously increasing the exposed projecting height of said disc in proportion as the pressure application is continued, to forge an upset head upon said wire section and to substantially uniformly flow and spread the disc metal over and to cold pressure weld it unto the surface of the head formed upon said section.

10. A method of fabricating laminated headed articles comprising firmly holding a wire section of cold pressure weldable metal in a tool member with one end of said section being exposed to project by a predetermined distance from a face of said member, axially aligning said section with a cylindrical anvil and a disc of different cold pressure weldable metal having diameters equal to the diameter of said section with said disc being interposed between and in abutting engagement with the opposing end surfaces of said section and said anvil, laterally confining said disc to provide an exposed initial portion having a predetermined, including zero, projecting height and abutting the exposed end surface of said section, and applying pressure between said member and said anvil in a direction axially of said section and said anvil while simultaneously increasing the projecting height of said disc in proportion as the pressure application is continued, to forge an upset head upon said wire section and to substantially uniformly flow and spread the disc metal over and to cold pressure weld it unto the surface of the head formed upon said section.

11. A method of fabricating laminated headed articles comprising firmly holding a wire section or the like of cold pressure weldable metal in a first tool member with one end of said section being exposed to project by a predetermined distance from a face of said member, placing a slug of different cold pressure weldable metal in a cavity of variable depth in the face of a second tool member in close fitting engagement with the walls of said cavity and with said slug being exposed to initially project by a predetermined, including zero, height from the face of said second member, aligning said slug and section in axially abutting relation, and applying pressure to said members in a direction axially of said slug and section while simultaneously increasing the exposed height of said slug by varying the depth of said cavity in proportion as the pressure application is continued, to thereby forge an upset head upon said section and to substantially uniformly flow and spread the slug metal over and to cold pressure weld it unto the surface of the head formed upon said section.

(References on following page)

References Cited in the file of this patent

UNITED STATES PATENTS

| | | |
|---|---|---|
| 2,352,429 | Gomperz | June 27, 1944 |
| 2,425,586 | Wolff | Aug. 12, 1947 |
| 2,597,153 | Lagarde et al. | May 20, 1952 |
| 2,698,548 | Sowter | Jan. 4, 1955 |
| 2,739,369 | Cooney | Mar. 27, 1956 |
| 2,739,370 | Cooney | Mar. 27, 1956 |
| 2,909,951 | Rozmus et al. | Oct. 27, 1959 |

FOREIGN PATENTS

| | | |
|---|---|---|
| 27,465 | Great Britain | June 18, 1914 |
| 793,402 | Great Britain | Apr. 16, 1958 |
| 688,400 | Germany | Apr. 28, 1938 |